US008555075B2

(12) United States Patent
Kessler

(10) Patent No.: US 8,555,075 B2
(45) Date of Patent: Oct. 8, 2013

(54) METHODS AND SYSTEM FOR STORING AND RETRIEVING IDENTITY MAPPING INFORMATION

(75) Inventor: Dieter Kessler, Gräfenhausen (DE)

(73) Assignee: Software AG, Darmstadt (DE)

( * ) Notice: Subject to any disclaimer, the term of this patent is extended or adjusted under 35 U.S.C. 154(b) by 1295 days.

(21) Appl. No.: 11/858,211

(22) Filed: Sep. 20, 2007

(65) Prior Publication Data

US 2008/0089520 A1 Apr. 17, 2008

(30) Foreign Application Priority Data

Oct. 17, 2006 (EP) .................................... 06021701

(51) Int. Cl.
*H04L 29/06* (2006.01)

(52) U.S. Cl.
USPC .................... 713/182; 380/277; 726/6; 726/8

(58) Field of Classification Search
USPC ............................. 713/182; 726/6; 380/277
See application file for complete search history.

(56) References Cited

U.S. PATENT DOCUMENTS

| 6,854,056 | B1 | 2/2005 | Benantar et al. | |
|---|---|---|---|---|
| 2002/0112045 | A1* | 8/2002 | Nirkhe et al. | 709/223 |
| 2003/0033545 | A1* | 2/2003 | Wenisch et al. | 713/202 |
| 2004/0128542 | A1* | 7/2004 | Blakley et al. | 713/201 |
| 2006/0129817 | A1* | 6/2006 | Borneman et al. | 713/170 |
| 2006/0218628 | A1* | 9/2006 | Hinton et al. | 726/8 |
| 2007/0005600 | A1* | 1/2007 | Dutta et al. | 707/9 |
| 2008/0021997 | A1* | 1/2008 | Hinton | 709/225 |

FOREIGN PATENT DOCUMENTS

EP 1 672 555 6/2006

OTHER PUBLICATIONS

G. Chiozzi et al, "CORBA-based Common Software for the ALMA project", European Southern Observatory, pp. 1-12, 2002.*
European search report for application EP 06 02 1701, mailed May 9, 2007.

* cited by examiner

*Primary Examiner* — Taghi Arani
*Assistant Examiner* — Jason Lee
(74) *Attorney, Agent, or Firm* — Meyertons Hood Kivlin Kowert & Goetzel, P.C.; Jeffrey C. Hood; Joel L. Stevens

(57) ABSTRACT

System and method for storing identity mapping information in an identity management system to enable a user authenticated at a first domain to access a second domain. The method may include digitally signing the identity mapping information by the user; providing the mapping information to an identity management system; and storing the user-signed mapping information after being further digitally signed by the identity management system.

8 Claims, 4 Drawing Sheets

METHODS AND SYSTEM FOR STORING AND RETRIEVING IDENTITY MAPPING INFORMATION

PRIORITY CLAIM

Figure 1:
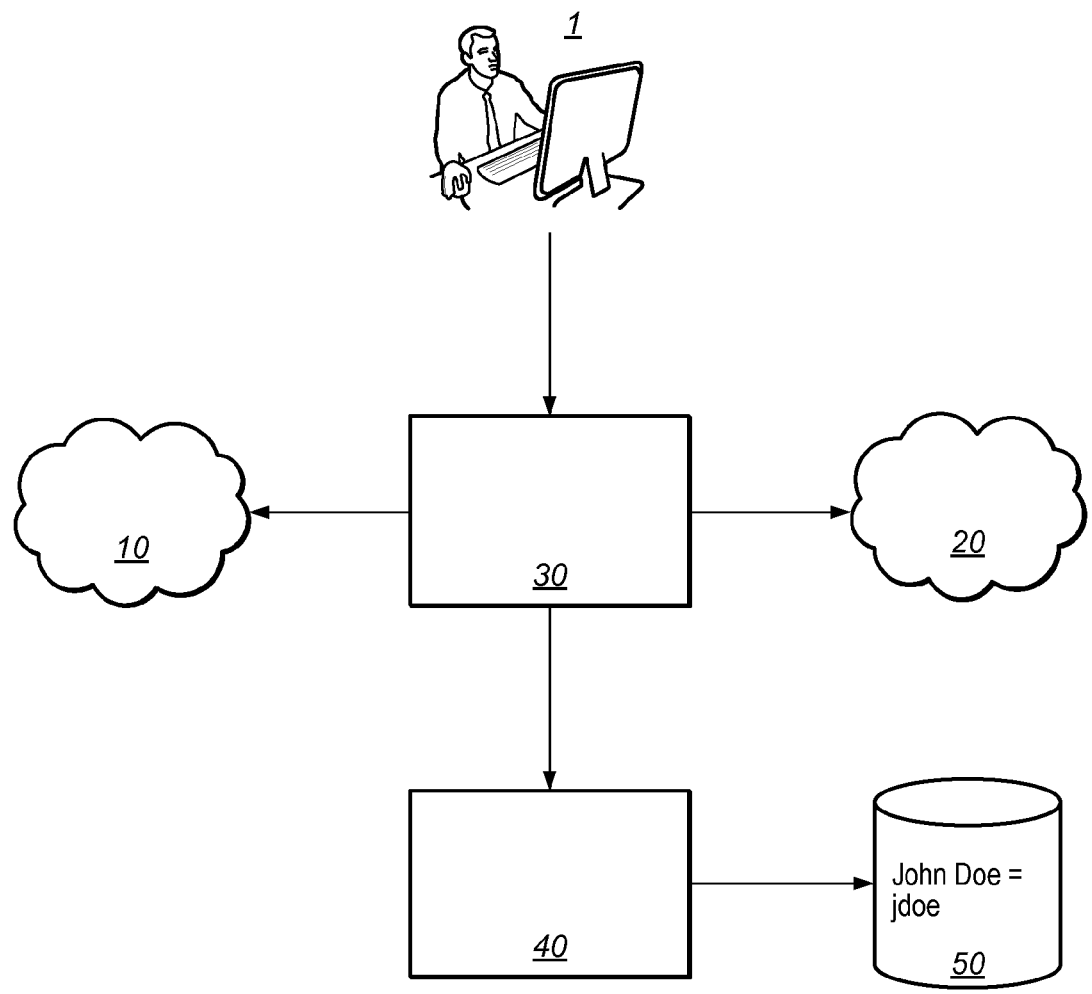

This application claims benefit of priority of European application no. 06 021 701.5 titled "Methods and System for Storing and Retrieving Identity Mapping Information", filed Oct. 17, 2006, and whose inventor is Dieter Kessler.

INCORPORATED BY REFERENCE

This application claims benefit of priority of European application no. 06 021 701.5 titled "Methods and System for Storing and Retrieving Identity Mapping Information", filed Oct. 17, 2006, and whose inventor is Dieter Kessler, is hereby incorporated by reference in its entirety as though fully and completely set forth herein.

TECHNICAL FIELD

The present invention relates to a system and method for storing and retrieving identity mapping information in an identity management system for enabling a user authenticated at a first domain to access a second domain.

BACKGROUND OF THE INVENTION

Personal information about users, as well as the mechanism to log onto computers, is typically hosted within central repositories. Each repository is called a domain or realm that binds each participating user to data within the repository. For example, when a user intends to obtain data from a computer system in a certain domain, he will typically have to authenticate himself and possibly also have his authorization verified which involves an access to the respective repository.

However, in larger organizations there are usually multiple domains. As a result, a user, which has already authenticated (and authorized) himself in a first domain and now wants to perform or access resources owned by a second domain, needs again to be authenticated in the second domain. This is particularly a problem, if the first and second domain are heterogeneous, i.e. if different hardware and/or software is used.

Kerberos is one system known in the prior art that provides a trust relationship when the first and second domain reside on some heterogeneous platforms. However, there are many practical instances where this approach cannot be used on heterogeneous systems (e.g. a Kerberos solution is unavailable for a platform or existing security systems and/or applications cannot easily be modified to fit the Kerberos approach). Other ways to address these difficulties to some extent are known from the EP 1 035 462 and the EP 1 650 923.

In particular for domains that are truly heterogeneous, i.e. there is no communication path defined between domains that allows to set up a trust relationship, one approach known in the prior art is to use some form of user identity mapping. When a user, which has already logged onto the first domain, intends to access resources from the second domain, his user id (for example "John Doe") of the first domain is mapped to another user id (for example "jdoe") which meets the specific requirements of the security system of the second domain. This mapping process is typically performed by an Identity Management System that accesses a database for this purpose.

However, the identity data that is stored in the database and passed on from the database to the application that requires the mapping is automatically trusted and cannot be checked at runtime by neither the application nor the user. In other words, there is no verification of the identity mapping information by either the user or the application once it has been stored. This presents a possible security gap that could be exploited by a malicious attack, if, for example, the identity mapping were modified to "hijack" another identity at another domain. More importantly, neither the user nor the application would even be able to detect that such an attack has occurred.

Correspondingly, improvements in user mappings between domains are desirable.

SUMMARY OF THE INVENTION

Various embodiments are described of a system and method for storing identity mapping information in an identity management system to enable a user authenticated at a first domain to access a second domain. The method may include digitally signing the identity mapping information by the user; providing the mapping information to an identity management system; and storing the user-signed mapping information after being further digitally signed by the identity management system.

Accordingly, the mapping information may be stored such that the user and the identity management system can verify the integrity of the stored mapping information by checking the two digital signatures. In particular, this method distinguishes from the approach taken by Kerberos, since the user has more control over the system.

The digitally signing of the identity mapping information by the user may involve the use of a private key of the user and the digitally signing of the identity mapping information by the identity management system may involve the use of a private key of the identity management system. Thus, the two digital signatures can preferably be checked by an application using the corresponding public keys of the user and the identity management system without needing the private key of the user and therefore requiring a dialogue with the user.

In one embodiment, the mapping information further comprises a password required to access the second domain. Accordingly, the method may further include encrypting at least the password with an encryption key, wherein the encryption key can be divided into at least a first and a second part; encrypting the first part of the encryption key with a public key of the user; encrypting the second part of the encryption key with a public key obtained from a trust center, and storing the encrypted password and the encrypted encryption key in the identity managing system.

Whereas the above described two-fold signature of the mapping information may only assure the integrity of the data, some embodiments also allow for increased security of personal information (e.g., avoiding inspection of passwords by a malicious attacker who somehow gained access to the mapping information).

These features further increase the security compared to prior art systems such as Kerberos. Whereas Kerberos relies on symmetric keys, embodiments described herein may use public/private cryptography for the most vital parts, as well as a twofold encryption of the sensitive data. Also, Kerberos is limited to handling user-ids and passwords, whereas embodiments herein can equally protect any sensitive user data. As such, Kerberos cannot easily be modified to increase the level of security nor can it be extended to store private user data.

According to another aspect, some embodiments relate to a method for retrieving identity mapping information from an identity management system for enabling a user authenticated at a first domain to access a second domain. The method may include retrieving user-signed mapping information, which has been further digitally signed by the identity management system; validating the digital signature of the identity management system; and validating the digital signature of the user.

As already mentioned above, the two validation steps may allow an application to assure the integrity of the user-signed mapping information so that any tampering with this information by a third party is excluded. In one embodiment, if private keys of the user and the identity management system are used for the digital signatures, public keys can be used for the respective validation step.

In some embodiments, the method may use a certificate of the user tying his public key to his identity, which is preferably obtained from a trust centre (PKI). If the user wants to revoke or invalidate the mapping information (for example, when a user leaves a company), he can simply inform the trust centre (PKI) to void this specific certificate. As a result, the application can subsequently no longer verify the signature for the given user mapping. It is to be noted that this revocation is under control of the user.

In one embodiment, a password may be retrieved in addition to the mapping information, which may be required to access the second domain and which may be encrypted by an encryption key. The encryption key may include at least a first part encrypted by a public key of a user and a second part encrypted by a public key obtained from a trust center. Accordingly, the method may include sending the first encrypted part of the encryption key to the user for decryption with his private key; sending the second encrypted part to the trust centre for decryption; and decrypting the password with the encryption key assembled from the decrypted first and second part.

Correspondingly, the password may be secured (or any other personal private data) under the user's control and without exposing the user's private key. Tampering with the password may now no longer be possible as is passing around the password without the user's knowledge and permission. In addition, malicious attacks are made more difficult, since the complete encryption key required to retrieve the password is never transmitted as a whole on a single communication path.

Finally, embodiments described above may be implemented according to concerns an identity management system as well as a memory medium comprising program instructions that are executable by a processor.

SHORT DESCRIPTION OF THE DRAWINGS

Figure 2:
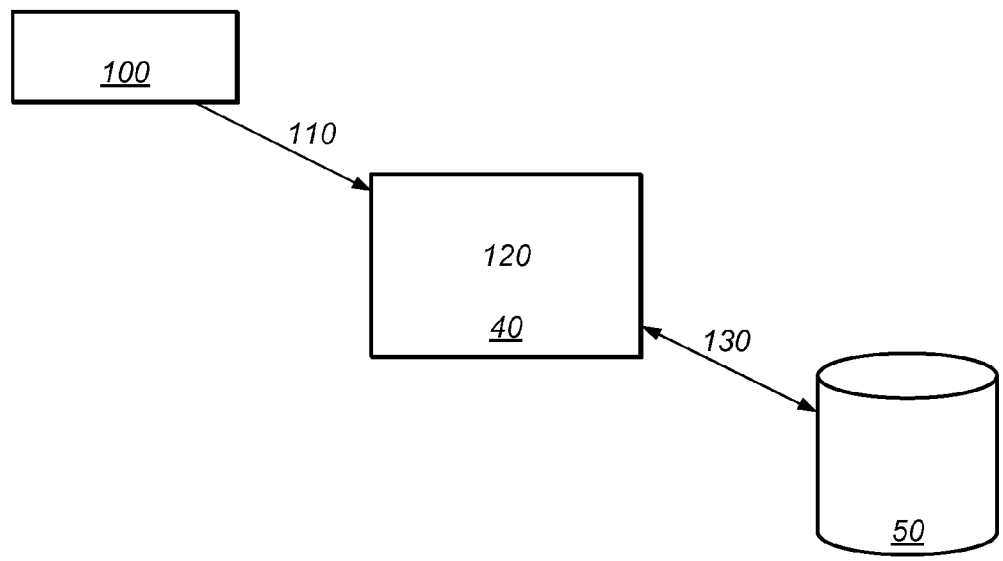
Figure 3:
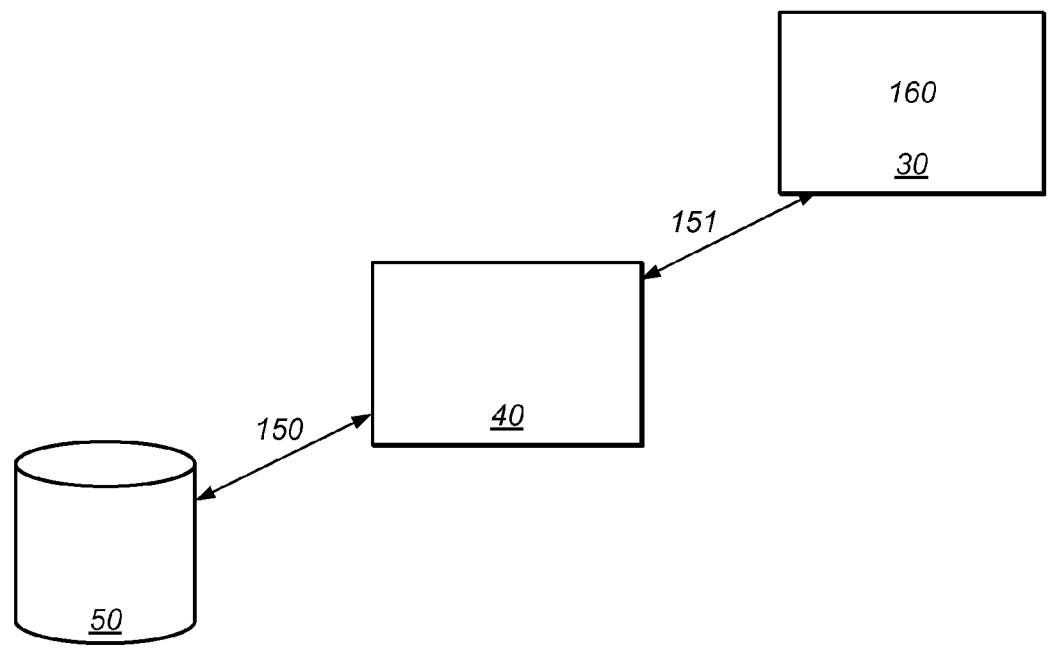
Figure 4A:
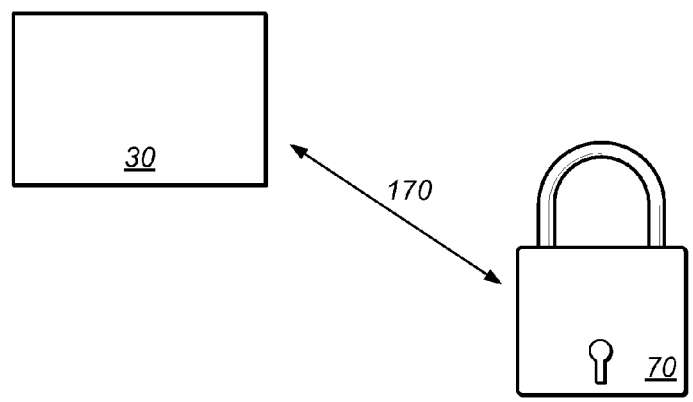
Figure 4B:
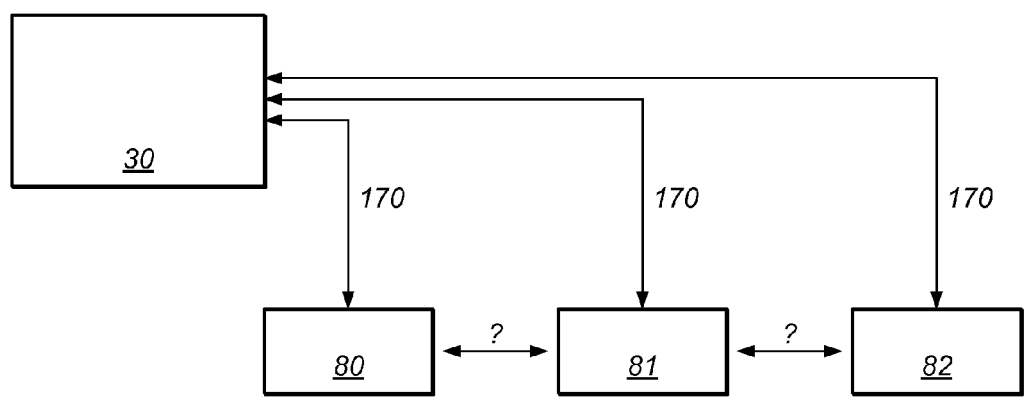
Figure 5:
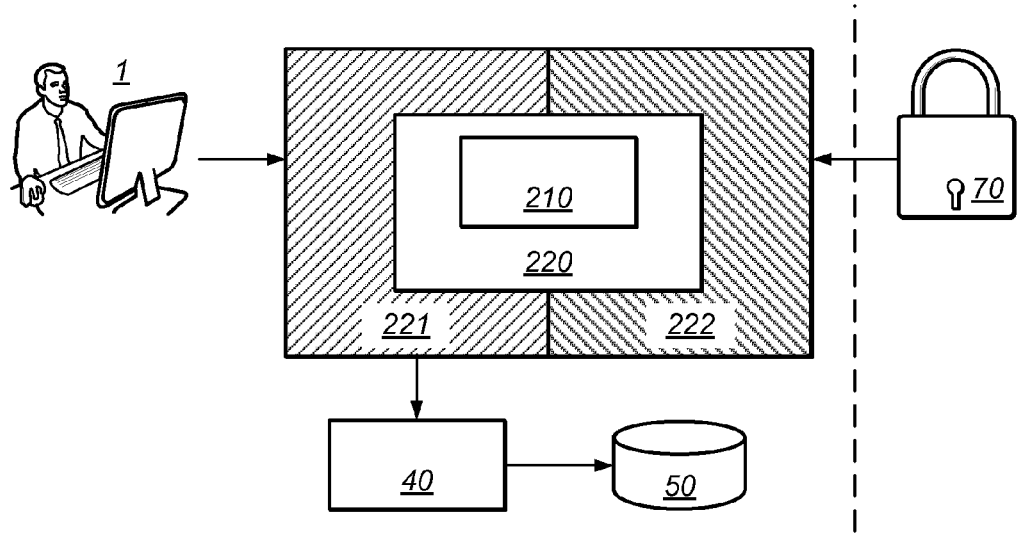

In the following detailed description, presently preferred embodiments of the invention are further described with reference to the following figures:

FIG. 1: A schematic view illustrating user identity mapping, according to one embodiment;

FIG. 2: A schematic presentation of the steps performed in one embodiment of the invention to perform a secure user mapping for storing mapping information so that its integrity is assured;

FIG. 3: A schematic presentation of a first part of the steps performed in one embodiment of the invention for a retrieval and a validation of the outer signature of the user mapping information;

FIG. 4a: A schematic presentation of the second part of the steps performed for a retrieval and an online validation of the inner signature of the user mapping information, according to one embodiment;

FIG. 4b: A schematic presentation of an offline validation of the inner signature of the user mapping information, according to one embodiment;

FIG. 5: A schematic presentation of the password (or other private personal information) as protected according to various embodiments; and FIG. 6: A schematic presentation of the steps necessary to retrieve a password as protected by the embodiment of FIG. 5.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

FIG. 1 presents a schematic view of two domains 10, 20, which require different user ids for accessing data. Domain 10 may for example present a Windows-based corporate network, whereas domain 20 could be a legacy mainframe system comprising one or more applications and/or one or more databases. A user 1 running an application 30 may require data from both domains 10, 20. Accordingly, the user 1 must be authenticated and, if required, prove his authorization in both domains 10, 20. An identity management system 40 comprising a user identity database 50, however, may allow the application 30 to obtain the user id for the second domain 20 based on the user id for the first domain 10. As a result, the user 1 may only provide a single user id. In the example presented in FIG. 1, the user 1 only needs to authenticate himself as "John Doe" at the first domain 10 and the application 30 can, based on the relation stored in the user identity database 50, also authenticate the user at the second domain 20 as "jdoe".

It is apparent that that the concept of mapping user ids with an identity management system could be extended to more than the two domains 10, 20 shown in the simplified FIG. 1. Further, whereas the methods and systems described in the following are particularly useful, if the two domains 10 and 20 are truly heterogeneous, so that no common security system can be found or created, the present invention may also be applied to less heterogeneous or even homogeneous systems.

If the user identity database 50 is tampered with, a user id of the first domain 10 may no longer be assigned to the correct user id of the second domain 20. As a result, operations could be performed in the second domain 20 under a false identity, without the user 1 being aware of.

To address this problem, some embodiments allow for verification of the mapping information for both the user 1 and the application 30. In one embodiment, a trust centre (PKI, Public Key infrastructure) may be used. However, this is not essential to the invention. In order to assure the integrity of the mapping data stored in the user identity database 50, each user may first agree to the user mapping by signing his mapping data with his private key in step 100 shown in FIG. 2. In the example of FIG. 1, the user "John Doe" in domain 10 is mapped to user "jdoe" in domain 20.

The mapping data and the signature value may be sent in step 110 to the identity management system 40 for storing. To increase the security, a SSL communication (secure socket layer) may be used. In a next step 120, the identity management system 40 may again sign the received information with its own private key and may store, in step 130, the two-fold signed mapping information in the user identity database 50.

At any point later in time, the application 30 can perform the required user mapping by performing the following validation steps: At first, the two-fold signed mapping information may be obtained from the identity management system in steps 150 and 151 (cf. FIG. 3). Again, a SSL communication may be used to further increase the security. Subsequently, in step 160, the method may verify that the mapping information was authenticated by the identity management system 40 by validating its outer signature (cf. FIG. 3). This may typically be an offline process, i.e. can be performed locally by the application 30 using the public key of the identity management system 40.

In the next step 170, the method may verify that the authenticated user 1 has defined and agreed to the mapping by validating the inner signature. If the application 30 is in possession of the user's certificate, it can perform the validation offline by checking that the authenticated user's credentials 80 match the certificate credentials 81 as well as the information from the user mapping data 82 (cf. FIG. 4b).

Alternatively it can use an online validation with the trust centre (PKI) 70, as schematically shown in FIG. 4a. This has a further advantage: If the user 1 (or any other authorized party) had previously invalidated the user mapping, the certificate used to sign this mapping would have been revoked and the mapping may then be rendered invalid by a standard mechanism, e.g., Certificate Revocation List (CRL), which is a method to void a certificate and therefore all signatures that are created by the owner of the certificate before the expiration time automatically declares it invalid.

Figure 6:
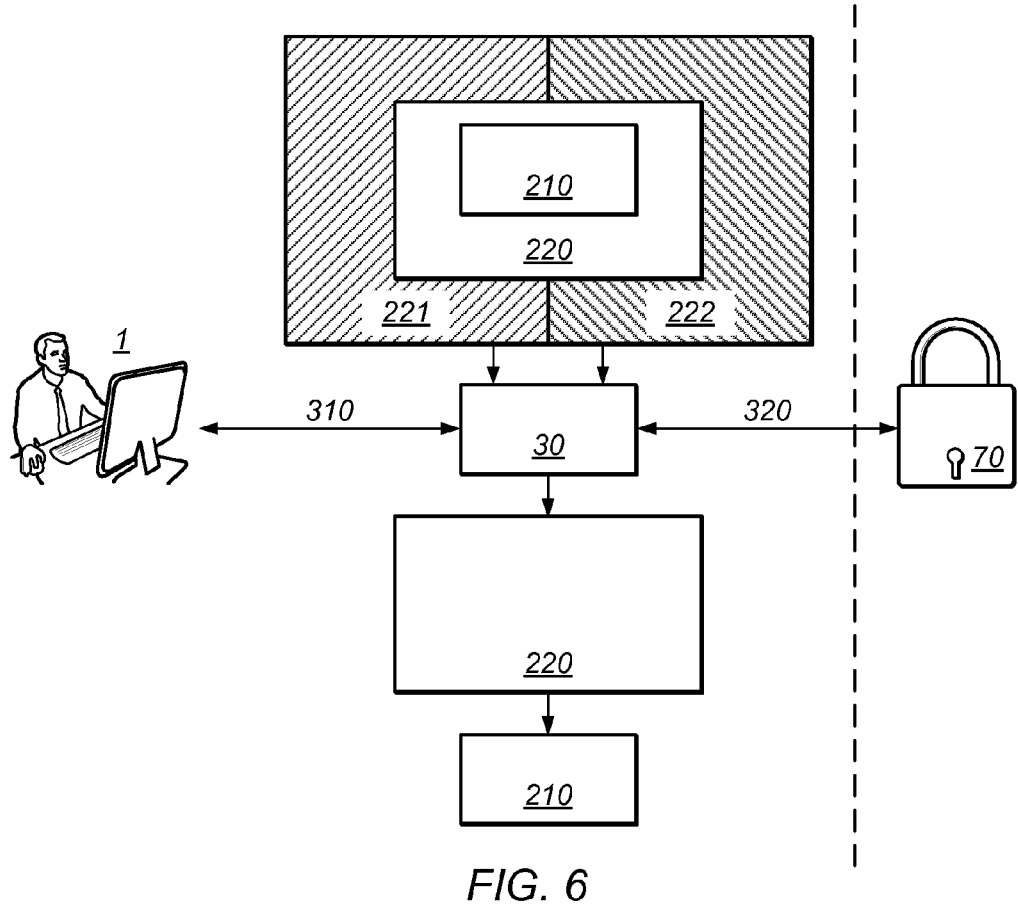

FIGS. 5 and 6 illustrate relate to incorporating information protection. This aspect may be used and, in the following, described in the context of the method and system explained above for the verification of the integrity of user mapping information. It may, however, also be applied in general, e.g., whenever personal private data is stored, so that it is not necessary to enter it every time when this data is required. Accordingly, password protection is just one example of a field of application of the method described in the following, but it can equally be used to protect sensitive financial information such as credit card numbers or any other data to be protected.

If a password is needed to access the second domain 20, it is not sufficient to assure its integrity in the user mapping database 50. On the contrary, it may not only be protected against tampering but also may be kept in a truly secure and encrypted manner, which is, for example, not the case in prior art systems such as Kerberos. Otherwise, there would be a security gap that could be exploited in a malicious attack (e.g. to commit fraud or steal identity). As noted previously, in prior art systems the user has typically no control over how the password is stored or used. Therefore, he is required to give absolute trust to the system that stores and uses his password.

As shown in FIG. 5, before the password 210 is stored together with the user mapping information, an encryption key 220 may be used to encrypt the password 210. The encryption key 220 may be long enough to be divided into two parts 221, 222 (or more parts, not shown in FIG. 5). The first part 221 of the encryption key 220 may be encrypted by the users' public key. The other part 222 may be encrypted by the public key of a special certificate from the trust centre (PKI) 70. The encrypted password 210 may then be stored together with the encrypted two part encryption key and signed together with the mapping information of the user as described above.

When the password 210 is required by the application 30 (e.g. in order to access the resources in domain 20), then the application 30 may first execute all the steps to obtain the validated user mapping information as described previously. In order to decrypt the encrypted password, the application 30 may then perform the following steps (cf. FIG. 6):

In step 310, the first part 221 of the encrypted password key 220 may be sent to the user 1. The user 1 can decrypt the part 221 of the key 220 by using his private key. It is to be noted that neither the password 210, nor the complete key 220 to decrypt the password 210 travels on a communication channel during this step.

The application 30 may take, in step 320, the second half 222 of the encrypted encryption key 220 and send it to the trust centre (PKI) 70 for decryption. The dashed lines in FIGS. 5 and 6 indicate that the trust centre (PKI) 70 can be at any remote location. Now the application 30 holds the complete key 220 that is used to decrypt the password 210.

As a result, the password 210 is under the user's control and can be decrypted without exposing the user's private key. Tampering with the password 210 is no longer possible nor is passing around the password 210 without the user's knowledge and permission. Malicious attacks are therefore better defended, since the complete key 220 required to unlock the password 210 is never transmitted as a whole (e.g. on a single communication path).

The described method can be effectively used in all systems where personal and sensitive data is stored and should be revealed only at the time where all participating parties (user and application) agree. Further, if the encryption key 220 is divided into more than two parts, there could be more parties required to agree before an encrypted encryption key for the encrypted personal and sensitive data can be fully assembled from its various decrypted parts. In fact, this feature may allow for any number of participants. Accordingly, in a scenario like a bank—when private data needs to be protected—a normal transaction might only require two keys, but for 'higher risk' transactions, the data could be additionally protected with a third key (for example of an additional supervisor) to unlock the information. It is to be noted that it is easy to change the number of keys required.

An additional security feature (not shown) for providing even more protection against malicious attacks can be realized by providing the application itself with additional credentials, which are also verified, for example by the identity mapping system 40 and/or the trust centre (PKI) 70. This overcomes a remaining security problem, where, if by some means (e.g. Trojan horse), the application is replaced. Since the application may be activated by a user running with administrative privileges, also a (secretly) replaced application would have these privileges. However, in case of an additional verification of a certificate/identity of the application by the trust center (PKI) and/or the IMS, there would be a considerable hurdle for any faked or malicious application to overcome. This feature may be particularly important to financial companies such as banks which create an application once and then have a widely replicated distribution. In such a situation one could envisage a malicious attack on the application at a number of stages in its production, distribution and installation stages. In addition, companies and organizations who provide operating system software, such as Windows or Linux, might well find a use for such a feature in protecting critical access to parts of their O/S as well as critical files. Users of such operating systems might also get added protection to their own files and discs.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A method for retrieving identity mapping information from a trusted identity management system for enabling a user authenticated at a first domain to access a second domain, the method comprising:

utilizing a computer system to perform:

retrieving, by an application, user-signed identity mapping information for the user, wherein the identity mapping information was digitally signed by the user using a private key of the user, and where the identity mapping information has further been digitally signed by the identity management system using a private key of the identity management system, wherein the identity management system is trusted by at least the first domain, wherein the identity mapping information comprises a mapping of the user's user identification (ID) in the first domain to the user's user ID in the second domain, and wherein the user ID in the first domain is different from the user ID in the second domain;

validating, by the application, the digital signature of the identity management system using a public key of the identity management system; and validating, by the application, the digital signature of the user using a public key of the user;

wherein after said validating the digital signature of the identity management system and said validating the digital signature of the user, the user can be authenticated to access the second domain, and wherein either the user or any authorized party can revoke authentication of the identity mapping information for the user, wherein control of the user's identity mapping information is shared between the user and the identity management system; and wherein the method is operable regardless of whether the first and second domains have a trusted or untrusted relationship.

2. The method of claim 1, wherein said validating the digital signature of the user comprises using a certificate of the user comprising the public key of the user.

3. The method of claim 1, wherein the user certificate is obtained from a trust center.

4. The method of claim 1, wherein said retrieving further comprises retrieving a password, wherein the password is required to access the second domain and is encrypted by an encryption key comprising at least a first part encrypted by a public key of the user and a second part encrypted by a public key obtained from a trust center, wherein the method further comprises:

sending the first encrypted part of the encryption key to the user for decryption with his private key;

sending the second encrypted part to the trust center for decryption; and decrypting the password with the encryption key assembled from the decrypted first and second part.

5. A non-transitory computer accessible memory medium comprising program instructions for retrieving identity mapping information from an identity management system for enabling a user authenticated at a first domain to access a second domain, wherein the program instructions are executable by a processor to:

retrieve, by an application, user-signed identity mapping information for the user, wherein the identity mapping information was digitally signed by the user using a private key of the user, and where the identity mapping information has further been digitally signed by the identity management system using a private key of the identity management system, wherein the identity management system is trusted by at least the first domain, wherein the identity mapping information comprises a mapping of the user's user identification (ID) in the first domain to the user's user ID in the second domain, and wherein the user ID in the first domain is different from the user ID in the second domain;

validate, by the application, the digital signature of the identity management system using a public key of the identity management system; and validate, by the application, the digital signature of the user using a public key of the user;

wherein after said validating the digital signature of the identity management system and said validating the digital signature of the user, the user may be authenticated to access the second domain, and wherein either the user or any other authorized party can revoke authentication of the identity mapping information for the user, wherein control of the user's identity mapping information is shared between the user and the identity management system; and wherein the method is operable regardless of whether the first and second domains have a trusted or untrusted relationship.

6. The non-transitory computer accessible memory medium of claim 5, wherein said validating the digital signature of the user comprises using a certificate of the user comprising the public key of the user.

7. The non-transitory computer accessible memory medium of claim 6, wherein the user certificate is obtained from a trust center.

8. The non-transitory computer accessible memory medium of claim 5, wherein said retrieving further comprises retrieving a password, wherein the password is required to access the second domain and is encrypted by an encryption key comprising at least a first part encrypted by a public key of the user and a second part encrypted by a public key obtained from a trust center, and wherein the program instructions are further executable to:

send the first encrypted part of the encryption key to the user for decryption with his private key;

send the second encrypted part to the trust center for decryption; and decrypt the password with the encryption key assembled from the decrypted first and second part.

* * * * *